United States Patent
Hossain et al.

(10) Patent No.: US 12,485,098 B1
(45) Date of Patent: Dec. 2, 2025

(54) ORGANIC NANOCOMPOSITE COATING FOR PHARMACEUTICAL APPLICATIONS AND A METHOD OF FABRICATION THEREOF

(71) Applicant: IMAM MOHAMMAD IBN SAUD ISLAMIC UNIVERSITY, Riyadh (SA)

(72) Inventors: ABM Sharif Hossain, Riyadh (SA); Fazliny Abdul Rahman, Kuala Lumpur (MY); Hasan Ahmed Rudayni, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/194,125

(22) Filed: Apr. 30, 2025

(51) Int. Cl.
*A61K 9/51* (2006.01)

(52) U.S. Cl.
CPC .......... *A61K 9/5161* (2013.01); *A61K 9/5123* (2013.01)

(58) Field of Classification Search
CPC .............................. A61K 9/5161; A61K 9/5123
See application file for complete search history.

(56) References Cited

U.S. PATENT DOCUMENTS

2024/0408025 A1   12/2024   Putans et al.

FOREIGN PATENT DOCUMENTS

| CN | 107417983 A | 12/2017 | |
| IN | 202441053761 A | 7/2024 | |
| KR | 10-1411364 B1 | 6/2014 | |
| WO | WO-2011004944 A1 * | 1/2011 | ............. A61Q 19/00 |

OTHER PUBLICATIONS

Prafull Chavan, et al., "Nanocomposite Starch Films: A New Approach for Biodegradable Packaging Materials", Starch-Starke; vol. 74, Issue 5-6, May 2022, 2100302, 11 pages.

* cited by examiner

*Primary Examiner* — Frederick F Krass
*Assistant Examiner* — Abdulrahman Abbas
(74) *Attorney, Agent, or Firm* — Oblon, McClelland, Maier & Neustadt, L.L.P.

(57) ABSTRACT

An organic nanocomposite coating for a pharmaceutical preparation includes a plant-based nanostarch derived from avocado seed, pumpkin peel, and potato starch. The coating further includes an organic composition including Acacia *arabica* gel, Lannea sp. natural gum, corn starch, moringa seed starch, olive leaf extract, fish-based glycerin, and okra gel. The coating further includes an antioxidant mixture including at least one pigment, and a plasticizer. The nanostarch has an average particle size of 16 nanometer (nm) or less.

20 Claims, 7 Drawing Sheets

| Hydrolyze a mixture of avocado seed, pumpkin peel, and potato starch with at least one inorganic acid to obtain the plant-based nanostarch |~52

↓

| Prepare an organic composition, then combine the plant-based nanostarch with the organic composition, the plasticizer, and the antioxidant mixture to form an organic nanocomposite coating |~54

↓

| Shape the organic nanocomposite coating into a capsule |~56

↓

| Dry the capsule for 1 to 3 hours (h) at a temperature of 25 to 40 degrees Celsius (°C) |~58

FIG. 1

ORGANIC NANOCOMPOSITE COATING FOR PHARMACEUTICAL APPLICATIONS AND A METHOD OF FABRICATION THEREOF

BACKGROUND

Technical Field

The present disclosure is directed towards a coating, and more particularly, towards an organic nanocomposite coating for use in pharmaceutical delivery devices such as capsules and films.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Plastic remains a dominant material in food packaging, urging an increasing search for biodegradable polymers to meet the demands of advancing technologies like tissue engineering, drug delivery, and gene therapy. In medical applications, coatings have been used to impart desired surface effects, enhance biocompatibility, and improve performance. Polyethylene (PE), polyvinyl chloride (PVC) and polyvinylidene chloride (PVDC) are the most widely used food packaging materials, and the film materials have the function of preventing oxygen ingress into packaging and thereby provide food-fresh packaging. Additionally chemical resistance and ease of processing make them suitable for applications ranging from medical packaging to implantable devices. However, plastic films pose notable challenges, including safety concerns, environmental degradation, and reliance on non-renewable petroleum resources. These challenges have increasingly restricted their use in food packaging.

Further, the use of synthetic coatings has also encountered significant challenges, including high production costs, complex manufacturing processes, and concerns related to toxicity. Additionally, the long-term stability and biodegradability of synthetic coatings raise concerns about their suitability for prolonged medical use. As a result, growing interest has emerged for developing biodegradable and biocompatible alternatives to enhance safety and treatment efficacy. Organic edible nanocomposite coatings offer a cost-effective and biocompatible solution, eliminating risks associated with synthetic materials. The development of such coatings is aimed to improve drug delivery systems by ensuring safer administration, better patient compliance, and reduced production expenses.

The use of organic nanocomposite coatings in pharmaceuticals has grown, replacing costly and potentially toxic synthetic coatings. Many coating materials remained challenging due to incompatibility, insolubility, instability, or difficulty in suspension, emphasizing the need for refined coating techniques in medical and packaging applications. Efforts to replace plastic films have led to bio-based food packaging films made from natural or biosynthetic materials as eco-friendly alternatives. However, challenges such as limited mechanical strength, high production costs, and scalability issues have persisted.

Accordingly, one object of the present disclosure is to provide an organic nanocomposite coating derived from bio-based sources for use in pharmaceutical applications that may avoid or eliminate drawbacks and limitations, such as poor adhesion in wet environments, insufficient flexibility, susceptibility to degradation, and potential toxicity, of conventional materials and methods.

SUMMARY

In an exemplary embodiment, an organic nanocomposite coating for a pharmaceutical preparation is described. The nanocomposite coating includes a plant-based nanostarch including avocado seed, pumpkin peel, and potato starch. The nanocomposite coating further includes an organic composition including Acacia *arabica* gel, Lannea sp. natural gum, corn starch, moringa seed starch, olive leaf extract, fish-based glycerin, and okra gel. The nanocomposite coating further includes an antioxidant mixture including at least one pigment and a plasticizer. Furthermore, the nanostarch has an average particle size of 16 nanometer (nm) or less.

In some embodiments, the pigment is at least one selected from the group including beetroot peel, *bougainvillea* flower, dragon peel, and fig fruit peel.

In some embodiments, the pigment has a carotene content of 2 liters per milligram (L/mg) to 3.5 L/mg.

In some embodiments, the pigment has an anthocyanin content of 4 L/mg to 5.5 L/mg.

In some embodiments, the organic nanocomposite coating has a pH of 6.5 to 7.5.

In some embodiments, the nanostarch has an average particle size of 14 nm or less.

In some embodiments, the plant-based nanostarch is present in an amount of 40 percent by weight (wt. %) to 60 wt. % relative to a total weight of the organic nanocomposite coating.

In some embodiments, the potato starch is present in the plant-based nanostarch in an amount of 1 weight by volume percent (w/v %) to 10 w/v % relative to a total volume of the plant-based nanostarch.

In some embodiments, the plasticizer is at least one selected from the group including diisononyl phthalate (DINP), di-2-ethylhexyl phthalate (DEHP), diisodecyl phthalate (DIDP), tri (2-ethylhexyl)trimellitate (TEHTM), and polyvinyl chloride (PVC).

In some embodiments, the avocado seed is present in the plant-based nanostarch in an amount of 15 w/v % to 25 w/v % relative to a total volume of the plant-based nanostarch.

In some embodiments, the plasticizer is a PVC-type plasticizer.

In another exemplary embodiment, a method of fabricating the aforementioned organic nanocomposite coating is described. The method includes hydrolyzing a mixture of avocado seed, pumpkin peel, and potato starch with at least one inorganic acid to obtain the plant-based nanostarch. Further, the method includes preparing the organic composition, then combining the plant-based nanostarch with the organic composition, the plasticizer, and the antioxidant mixture to form the organic nanocomposite coating.

In some embodiments, the method includes shaping the organic nanocomposite coating into a capsule and drying the capsule for 1 hour (h) to 3 h at a temperature of 25 degrees Celsius (° C.) to 40° C.

In some embodiments, the capsule has a thickness of 1 micrometer (μm) to 20 μm.

In some embodiments, the inorganic acid is at least one selected from the group including of hydrochloric acid, nitric acid, hydrobromic acid, sulfuric acid, hydrofluoric acid, and phosphorous acid.

In some embodiments, the inorganic acid is sulfuric acid and hydrochloric acid.

In some embodiments, the method further includes combining avocado seed, pumpkin peel, and potato starch to obtain a mixture, and drying the mixture at a temperature of 115° C. to 155° C. for 1 to 4 h.

In some embodiments, the okra gel in an amount of 1 wt. % to 6 wt. % relative to a total weight of the organic composition.

In some embodiments, the pumpkin peel is present in an amount of 10 wt. % to 25 wt. % relative to a weight of the plant-based nanostarch.

In some embodiments, the beetroot peel is present in an amount of 2 wt. % to 8 wt. % relative to a weight of the antioxidant mixture.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is an exemplary flow chart of a method for producing an organic nanocomposite coating, according to certain embodiments.

DETAILED DESCRIPTION

Figure 2A:
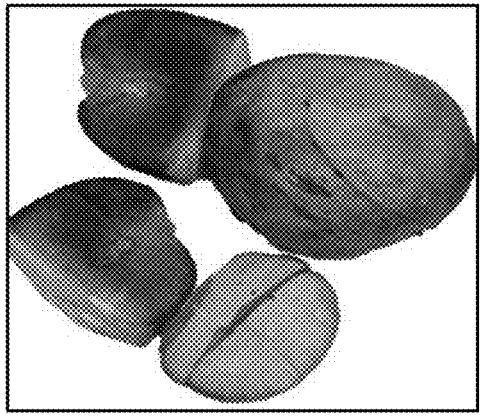
FIG. 2A shows a photographic image of avocado seed, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the term 'nanocomposite' refers to a composite material that has at least one component with an average grain size and/or an average particle size measured in nanometer (nm).

As used herein, the term 'pigment' refers to a colored substance that gives materials their hue by absorbing light at specific wavelengths. It is often used in paints, coatings, and other products to provide color and may also offer additional benefits, such as protection from UV radiation or improving the material's stability.

As used herein, the term 'nanostarch' refers to starch that has been physically or chemically broken down into particles having nanoscale dimensions.

As used herein, the term 'plasticizer' refers to a substance added to materials, typically polymers, to increase their flexibility, workability, and softness by reducing the viscosity or hardness of the material. It enhances the material's processing ability and performance in various applications. Plasticizers typically function by lowering the glass transition temperature of a material, allowing it to become more pliable. They are commonly used in the production of plastics, coatings, and rubber, and can be organic or inorganic compounds such as phthalates, glycerin, or citrates.

As used herein, the term 'average particle size' refers to the mean diameter of particles in a given sample, calculated by measuring the size distribution of particles and finding the central value. It is typically used to describe the size of powders, nanoparticles, or any particulate materials and is an important parameter in various fields such as materials science, pharmaceuticals, and nanotechnology. The average particle size is often determined through methods like scanning electron microscopy (SEM), dynamic light scattering (DLS), laser diffraction, or other microscopic techniques.

As used herein, the term 'anthocyanin' refers to a class of water-soluble pigments found in various fruits, vegetables, and flowers that provide a red, blue, or purple color. Anthocyanins are a type of flavonoid and are known for their antioxidant properties, helping to neutralize free radicals and reduce oxidative stress. They are often used in food, cosmetics, and health-related applications due to their potential health benefits, including anti-inflammatory, anti-cancer, and heart-protective effects.

As used herein, the term 'carotene' refers to a group of naturally occurring pigments, primarily found in fruits and vegetables, that give them their yellow, orange, and red colors. Carotene is a type of carotenoid, a class of compounds with antioxidant properties, and is particularly known for its role as a precursor to vitamin A in the body. Beta-carotene is the most common form, and it is important for vision, immune function, and skin health. Carotenes are widely used in dietary supplements, food coloring, and cosmetics due to their nutritional and health benefits.

As used herein, the term 'pharmaceutical preparation' refers to the process of formulating and manufacturing a drug into its final dosage form for administration to patients and/or a composition obtained by a pharmaceutical preparation process.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%, e.g., based on the total weight of the composition.

The present disclosure is intended to include all hydration states of a given compound or formula, unless otherwise noted or when heating a material.

Aspects of the present disclosure are directed toward an organic nanocomposite coating derived from bio-based sources for use in pharmaceutical applications. This coating aims to overcome issues such as poor adhesion, limited flexibility, and potential toxicity in traditional materials. It offers a safer, more sustainable alternative, improving drug delivery systems and overall performance.

An organic nanocomposite coating for a pharmaceutical preparation is described. The organic nanocomposite coating includes a plant-based nanostarch preferably including avocado seed starch, pumpkin peel starch, moringa seed starch, corn starch and potato starch, and an organic composition including Acacia *arabica* gel, Lannea sp. natural gum, olive leaf extract, fish-based glycerin, and okra gel.

Nanostarch is utilized for its enhanced properties, such as increased stability and better functionality. In alternate embodiments, nanostarch may be obtained from various natural sources, including banana peel, corn husk, rice husk, wheat straw, sugarcane bagasse, cassava peel, sweet potato, mango seed kernel, pineapple peel, apple pomace, coconut husk, soybean hull, pea pod, orange peel, lemon peel, jackfruit seed, *papaya* peel, barley husk, oat hull, grape pomace, tamarind seed, guava peel, aloe vera rind, durian rind, bamboo shoot waste, coffee husk, tea waste, pomegranate peel, and cotton stalk, date seed, durum seed coat, moringa seed, fish bone, sheep jawbone, and olive seed.

In some embodiments, the nanostarch has an average particle size of 25 nm or less, preferably 20 nm or less, preferably 15 nm or less, preferably 13.5 nm or less, preferably 13 nm or less, preferably 10 nm or less, and preferably 2 nm or greater, preferably 4 nm or greater, or preferably 10 nm or greater. In a preferred embodiment, the nanostarch has an average particle size of 13.5 nm.

In some embodiments, the plant-based nanostarch is present in an amount of 40-60 wt. %, preferably 41-59 wt. %, preferably 42-58 wt. %, preferably 43-57 wt. %, preferably 44-56 wt. %, preferably 45-55 wt. %, preferably 46-54 wt. %, preferably 47-53 wt. %, preferably 48-52 wt. %, and preferably 49-51 wt. % relative to a total weight of the organic nanocomposite coating.

In some embodiments, the potato starch is present in the plant-based nanostarch in an amount of 5-30 wt. %, preferably 10-20 wt. %, preferably 1-10 wt. %, preferably 2-9 wt. %, preferably 3-8 wt. %, preferably 4-7 wt. %, and preferably 5-6 wt. % relative to a total weight of the plant-based nanostarch. In a preferred embodiment, the potato starch is present in the plant-based nanostarch in an amount of 5 wt. %.

In some embodiments, the avocado seed starch is present in the plant-based nanostarch in an amount of 10-45 wt. %, preferably 15-25 wt. %, preferably 16-24 wt. %, preferably 17-23 wt. %, preferably 18-22 wt. %, and preferably 19-21 wt. % relative to a total weight of the plant-based nanostarch. In a preferred embodiment, the avocado seed is present in the plant-based nanostarch in an amount of 20 wt. %.

In some embodiments, the moringa seed starch is present in the plant-based nanostarch in an amount of 10-30 wt. %, preferably 15-25 wt. %, preferably 16-24 wt. %, preferably 17-23 wt. %, preferably 18-22 wt. %, and preferably 19-21 wt. % relative to a total weight of the plant-based nanostarch. In a preferred embodiment, the moringa seed starch is present in the plant-based nanostarch in an amount of 20 wt. %.

In some embodiments, the corn starch is present in the plant-based nanostarch in an amount of 5-20 wt. %, preferably 10-25 wt. %, preferably 15-24 wt. %, preferably 17-23 wt. %, preferably 18-22 wt. %, and preferably 19-21 wt. % relative to a total weight of the plant-based nanostarch. In a preferred embodiment, the corn starch seed is present in the plant-based nanostarch in an amount of 5-8 wt. %.

In some embodiments, the pumpkin peel is present in an amount of 10-25 wt. %, preferably 11-24 wt. %, preferably 12-23 wt. %, preferably 13-22 wt. %, preferably 14-21 wt. %, preferably 15-20 wt. %, preferably 16-19 wt. %, and preferably 17-18 wt. % relative to a weight of the plant-based nanostarch.

The organic composition preferably includes Acacia *arabica* gel, Lannea sp. natural gum, olive leaf extract, fish-based glycerin, and okra gel.

In some embodiments the organic composition contains Acacia *arabica* gel in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic composition.

In some embodiments the organic composition contains Lannea sp. natural gum in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic composition.

In some embodiments the organic composition contains okra gel in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic composition.

In some embodiments the organic composition contains olive leaf extract in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic composition.

In some embodiments the organic composition contains fish-based glycerin in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic composition.

The organic composition may include variations in the sources and concentrations of the ingredients, such as different natural gums or extracts. Different natural gums and adhesives that can be used include, but not limited to guar gum, xanthan gum, chitosan, pectin, sodium alginate, methyl cellulose, carboxymethyl cellulose, honey, wheat gluten, gum arabic, glycerin, beeswax, shellac, casein, gelatin, starch derivatives, cellulose acetate, pullulan, tragacanth gum, tamarind gum, locust bean gum, polyvinyl alcohol, polyacrylic acid, hydroxypropyl cellulose, guar gum derivatives, gelatinized starch, agar-agar, and cassava gum.

The organic nanocomposite coating further includes an antioxidant mixture including at least one pigment. The organic nanocomposite coating has a pH of 6.5-7.5, preferably 6.6-7.4, preferably 6.7-7.3, preferably 6.8-7.2, and preferably 6.9-7.1. This pH level is crucial for maintaining the coating's stability and enhancing its adhesion to different surfaces. It helps avoid any potential harm to the substrate while ensuring the coating remains effective and durable. Measured by dissolving or suspending the organic nanocomposite coating in water in an amount of 10 g/100 ml water and measuring the pH of the resulting mixture.

In some embodiments the organic nanocomposite coating contains the antioxidant mixture in an amount of 5-30 wt. %, preferably 10-25 wt. %, preferably 15-20 wt. %, preferably about 15 wt. %, relative to a total weight of the organic nanocomposite coating.

The antioxidant mixture contains various agents that help protect the organic nanocomposite coating from oxidation and enhancing its resistance to environmental stressors like UV light and heat. The antioxidant mixture helps in improving the longevity and stability of the material. In some embodiments, the antioxidant mixture contains one or more pigments selected from the group including beetroot peel, *bougainvillea* flower, dragon peel, and fig fruit peel. In alternate embodiments, the antioxidant mixture contains at least one pigment selected from pomegranate peel, turmeric, spinach leaves, blackberries, hibiscus flowers, grape skins, carrot tops, red cabbage, saffron, mulberry, and elderberries.

The antioxidant mixture preferably contains at least beetroot peel pigment, dragon fruit peel pigment, *bougainvillea* flower dye, and fig fruit peel pigment.

The organic nanocomposite coating preferably contains the beetroot peel pigment in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic nanocomposite coating.

The organic nanocomposite coating preferably contains the dragon fruit peel pigment in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic nanocomposite coating.

The organic nanocomposite coating preferably contains the *bougainvillea* flower dye in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic nanocomposite coating.

The organic nanocomposite coating preferably contains the fig fruit peel pigment in an amount of 1-6 wt. %, preferably 1.5-5.5 wt. %, preferably 2-5 wt. %, preferably 2.5-4.5 wt. %, preferably 3-4 wt. %, and preferably 3.5-4 wt. % relative to a total weight of the organic nanocomposite coating.

In some embodiments, the antioxidant mixture has a carotene content of 1-10 milligrams/gram antioxidant mixture (mg/gram), preferably 2-5 mg/gram, preferably 2.2-3.3 mg/gram, preferably 2.3-3.2 mg/gram, preferably 2.4-3.1 mg/gram, preferably 2.5-3 mg/gram, preferably 2.6-2.9 mg/gram, and preferably 2.7-2.8 mg/gram.

The antioxidant mixture preferably has an anthocyanin content of 1-10 milligrams/gram antioxidant mixture (mg/gram), preferably 4-5.5 mg/gram, preferably 4.1-5.4 mg/gram, preferably 4.2-5.3 mg/gram, preferably 4.3-5.2 mg/gram, preferably 4.4-5.1 mg/gram, preferably 4.5-5 mg/gram, preferably 4.6-4.9 mg/gram, and preferably 4.7-4.8 mg/gram.

The organic nanocomposite coating includes a plasticizer. In some embodiments, the plasticizer is at least one PVC-type plasticizer selected from the group including diisononyl phthalate (DINP), di-2-ethylhexyl phthalate (DEHP), diisodecyl phthalate (DIDP), tri (2-ethylhexyl)trimellitate (TEHTM), and polyvinyl chloride (PVC). In alternate embodiments, the plasticizer may include, but is not limited to dibutyl phthalate, dioctyl phthalate, dimethyl phthalate, butyl benzyl phthalate, acetyl tributyl citrate, acetyl triethyl citrate, epoxidized soybean oil, castor oil, glycerol, sorbitol, polyethylene glycol, polypropylene glycol, dioctyl adipate, di(2-ethylhexyl) sebacate, tributyl citrate, dibutyl sebacate, 2-ethylhexanol, butyl stearate, polyethylene glycol-400, propylene glycol, butylene glycol, diethylene glycol, triethylene glycol, and isopropyl myristate. In a preferred embodiment, the plasticizer is PVC.

In some embodiments, the plasticizer is present in an amount ranging from 1-15 wt. %, preferably 2-10 wt. %, preferably 3-8 wt. %, preferably 4-7 wt. %, preferably 5-6 wt. %, and preferably 5 wt. % relative to a total weight of the nanocomposite coating. In a preferred embodiment, the plasticizer is present in an amount of 6 wt. % relative to a total weight of the organic nanocomposite coating.

FIG. 1 illustrates a schematic flow chart of a method 50 of fabricating the organic nanocomposite coating. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes hydrolyzing a mixture of avocado seed starch, pumpkin peel starch, corn starch, moringa seed starch and potato starch with at least one inorganic acid to obtain the plant-based nanostarch. The inorganic acid is at least one selected from the group including hydrochloric acid, nitric acid, hydrobromic acid, sulfuric acid, hydrofluoric acid, and phosphorous acid. In alternate embodiments, the inorganic acid may include, but is not limited to, phosphoric acid, boric acid, carbonic acid, perchloric acid, chloric acid, hypochlorous acid, bromic acid, iodic acid, periodic acid, hydroiodic acid, chromic acid, permanganic acid, selenic acid, selenous acid, telluric acid, tellurous acid, silicic acid, tungstic acid, molybdic acid, stannic acid, stannous acid, vanadic acid, arsenic acid, arsenous acid, antimonic acid, antimonous acid, and pyrophosphoric acid. In a preferred embodiment, the inorganic acid is sulfuric acid and hydrochloric acid. In this process, the starch reacts with an inorganic acid under controlled temperature and time, breaking the polymer chains and forming smaller fragments or nanostarch particles. The acid aids in cleaving the starch molecules, ensuring the production of plant-based nanostarch.

At step 54, the method 50 includes preparing the organic composition, then combining the plant-based nanostarch with the organic composition, the plasticizer, and the antioxidant mixture to form the organic nanocomposite coating. This process ensures that the components are thoroughly blended, resulting in a coating with enhanced properties such as improved durability, flexibility, and protection.

At step 56, the method 50 includes shaping the organic nanocomposite coating into a capsule or film. In some embodiments, the film or capsule has a wall thickness of 1-20 µm, 1-20 µm, preferably 2-19 µm, preferably 3-18 µm, preferably 4-17 µm, preferably 5-16 µm, preferably 6-15 µm, preferably 7-14 µm, preferably 8-13 µm, preferably 9-12 µm, and preferably 10-11 µm.

At step 58, the method 50 includes drying the capsule for 1-3 hours (h), preferably 1.5-2.5 h, preferably 1.75-2.25 h, and more preferably 2 h at a temperature of 25-40 degrees Celsius (° C.), preferably 26-39° C., preferably 27-38° C., preferably 28-37° C., preferably 29-36° C., preferably 30-35° C., preferably 31-34° C., and preferably 32-33° C. The capsule may be dried by using heating appliances such as ovens, vacuum ovens, microwaves, autoclaves, hot plates, heating mantles and tapes, oil baths, salt baths, sand baths, air baths, hot-tube furnaces, and hot-air guns.

The method further includes combining avocado seed, pumpkin peel, and potato starch to obtain a mixture and drying the mixture at a temperature of 115-155° C., preferably 117-153° C., preferably 119-151° C., preferably 121-149° C., preferably 123-147° C., preferably 125-145° C., preferably 127-143° C., preferably 129-141° C., preferably 131-139° C., and preferably 133-137° C. for 1-4 h, preferably 1.5-3.5 h, preferably 1.75-3.25 h, preferably 2-3 h, preferably 2.5-3 h, preferably 2.75-2.9 h, and preferably 3-3.5 h.

EXAMPLES

The following examples demonstrate an organic nanocomposite coating. The examples are provided solely for illustration and are not to be construed as limitations of the present disclosure, as many variations thereof are possible without departing from the spirit and scope of the present disclosure.

Example 1: Material and Methods

The process includes several steps: drying or pyrolysis of a combination of avocado seed starch (40 weight/volume percent (w/v %)), pumpkin peel starch (30 w/v %), moringa seed starch (10 w/v %), corn starch (10 w/v %) and potato starch (10 w/v %) was at 135 degrees Celsius (° C.) in the oven for 3 hours (h). This was followed by acid hydrolysis, where 89 w/v % sulfuric acid ($H_2SO_4$) and 84 w/v % hydrochloric acid (HCl) were used to convert the micro particles of starch into nano-sized particles. Plasticizers, such as polyvinyl chloride-type (6 wt. %) were incorporated along with a mixture of organic substances including okra gel (3 wt. %), Acacia *arabica* gel (3 wt. %), natural glue from fresh gum (Lannea sp.) (wt.3%), and glycerin derived from fish byproducts (wt.3%). Nutritive substances like olive leaf extract, which contains antioxidants and minerals, were also added. Additionally, organic pigments or dyes, including beetroot peel pigment (5 wt. %), dragon fruit peel pigment (4 wt. %), *bougainvillea* flower dye (3 wt. %), and fig fruit peel pigment (wt.5%) for anthocyanin, were included as antioxidants in the formulation along with distilled water.

Figure 2B:
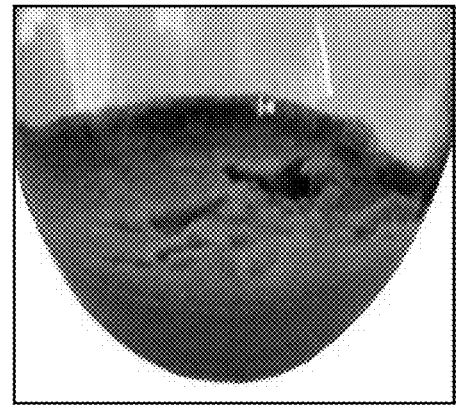
FIG. 2B is a visual depiction of the acid hydrolysis of the seed, according to certain embodiments.
Figure 2C:
FIG. 2C shows a photographic image of fig fruit peel, according to certain embodiments.
Figure 2D:
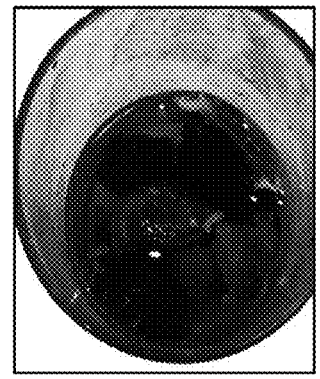
FIG. 2D shows a photographic image of fig fruit peel extract, according to certain embodiments.
Figure 2E:
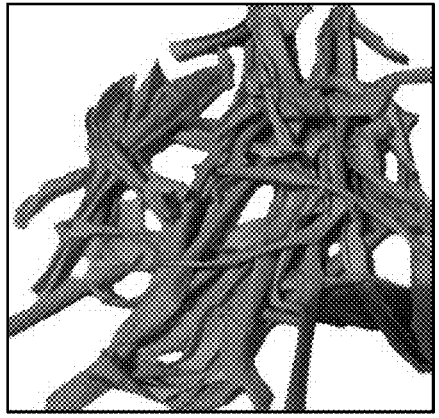
FIG. 2E shows a photographic image of pumpkin peel biomass, according to certain embodiments.
Figure 2F:
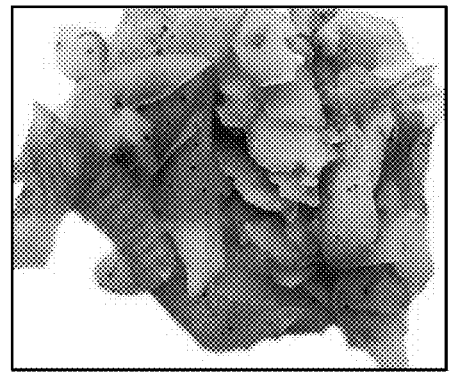
FIG. 2F shows a photographic image of potato peel biomass, according to certain embodiments.
Figure 2G:
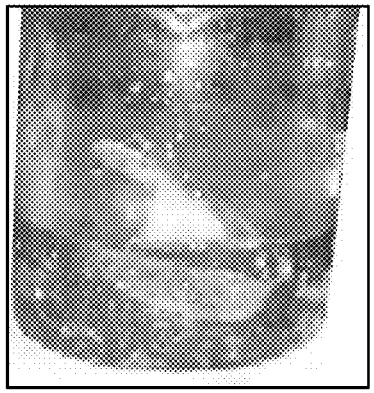
FIG. 2G shows a photographic image of fish byproducts, according to certain embodiments.
Figure 2H:
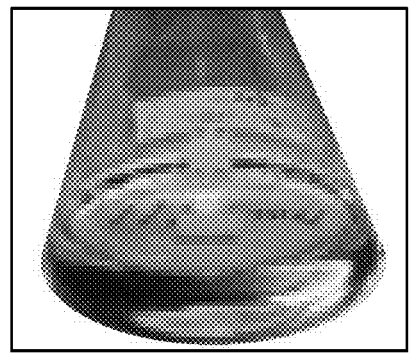
FIG. 2H shows a photographic image of fish glycerine, according to certain embodiments.
Figure 2I:
FIG. 2I is photographic image of olive leaf, according to certain embodiments.
Figure 2J:
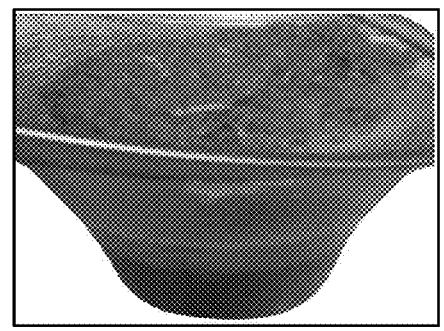
FIG. 2J shows a photographic image of olive leaf extract, according to certain embodiments.
Figure 2K:
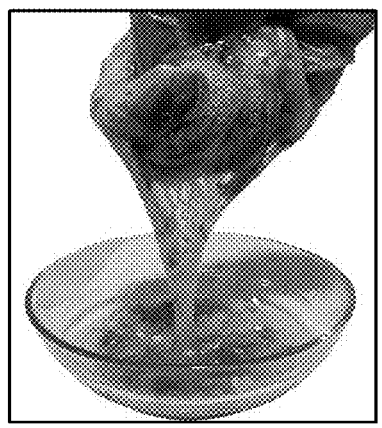
FIG. 2K shows a photographic image of okra gel, according to certain embodiments.
Figure 2L:
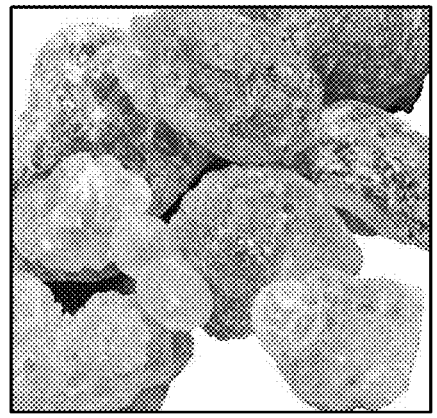
FIG. 2L shows a photographic image of Acacia *arabica* gum, according to certain embodiments.
Figure 2M:
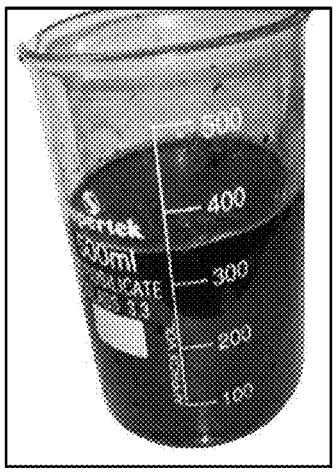
FIG. 2M shows a photographic image of color extraction from beetroot, according to certain embodiments.
Figure 2N:
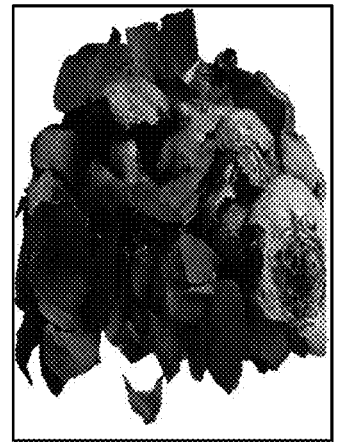
FIG. 2N shows a photographic image of beetroot peel, according to certain embodiments.
Figure 3A:
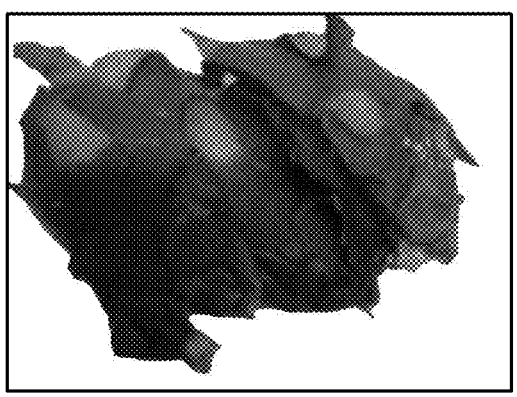
FIG. 3A shows a photographic image of dragon fruit peel, according to certain embodiments.
Figure 3B:
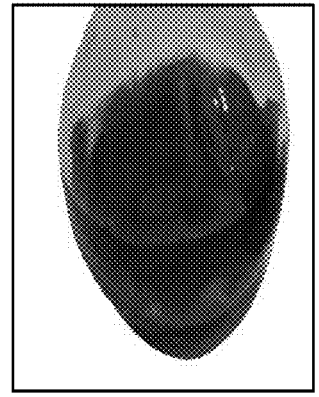
FIG. 3B shows a photographic image of dragon fruit dye, according to certain embodiments.
Figure 3C:
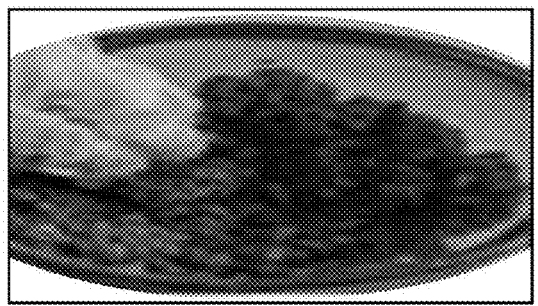
FIG. 3C shows a photographic image of moringa seed, according to certain embodiments.
Figure 3D:
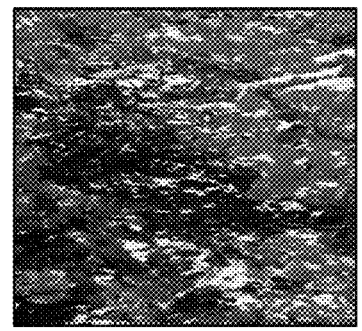
FIG. 3D shows a photographic image of *bougainvillea* flower, according to certain embodiments.
Figure 3E:
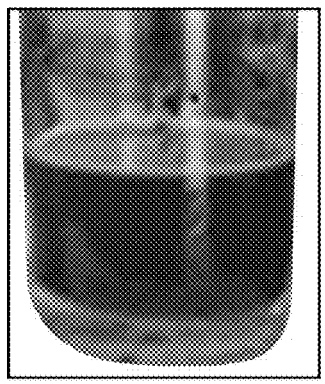
FIG. 3E shows a photographic image of *bougainvillea* flower dye, according to certain embodiments.
Figure 3F:
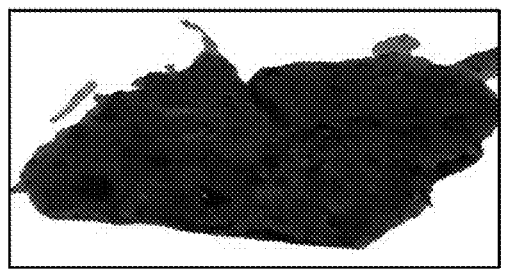
FIG. 3F shows a photographic image of plasticizer mixture with color, according to certain embodiments.
Figure 4A:
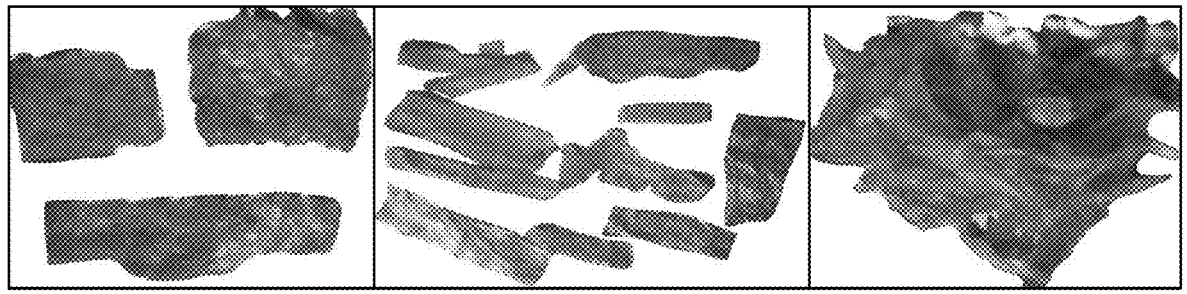
FIG. 4A shows photographic images of different shapes of organic nutritive nanocomposite coating for capsules and tablets, according to certain embodiments.
Figure 4B:
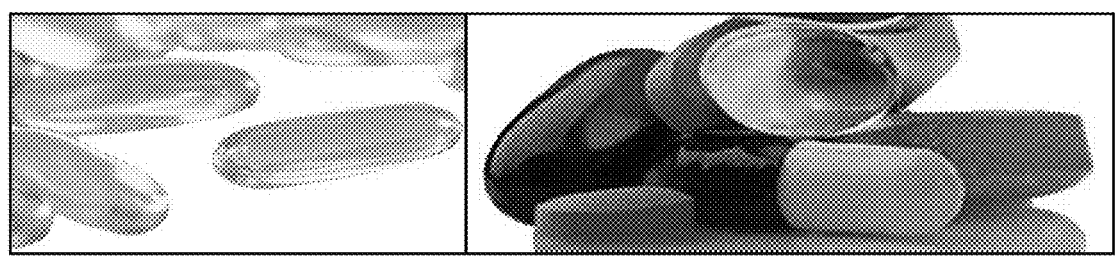
FIG. 4B shows photographs of synthetic coatings in different shapes for capsules and tablets, according to certain embodiments.

FIG. 2A shows a photographic image of avocado seed and FIG. 2B is a visual depiction of the acid hydrolysis of the seed. FIGS. 2C-2L show photographic images of fig fruit peel, fig fruit peel extract, pumpkin peel biomass, potato peel biomass, fish byproducts, fish glycerine, olive leaf, olive leaf extract, okra gel, Acacia *arabica* gum, respectively. FIGS. 2M-2N show photographic images of color extraction from beetroot and beetroot peel, respectively. FIGS. 3A-3F shows photographic images of dragon fruit peel, dragon fruit dye, moringa seed, *bougainvillea* flower, *bougainvillea* flower dye, and plasticizer mixture with color, respectively. FIG. 4A shows photographic images of different shapes of organic nutritive nanocomposite coating for capsules and tablets and FIG. 4B shows photographs of synthetic coatings in different shapes for capsules and tablets.

Initially, the samples were soaked in distilled water for 1 h. They were then soaked in a sodium hypochlorite (NaOCl) solution for bleaching for 2 h. Following this, 84% HCl and 89% $H_2SO_4$ were used for hydrolysis. As a result, nanostarch biocomposite was produced, which was subsequently mixed with various organic components to form the final nano bio-composite.

Example 2: Determination of pH, Antioxidant, and Starch in the Samples

The pH, antioxidant content, and starch composition of the nanocomposite biomaterial of the present disclosure were determined using established methods. The values were compared to synthetic coating available in the market, transparent vegetable (gelatin) capsule Shiva Trading Co. The results of the study are depicted in Table 1.

TABLE 1

Determination of pH, antioxidant and starch in the samples.

| Materials | pH determination | Starch determination | Antioxidant as Carotene | Antioxidant as anthocyanin |
|---|---|---|---|---|
| Nanocomposite coating | 7.3 ± 0.03 | 59.2% ± 0.01 | ±0.32.9 (mg/L) | ±0.2 4.9 (mg/L) |
| Synthetic coating | Alkaline ≥ 7 | It is zero if from gas or oil. If from starch sample it is 20-60%. | 0 | 0 |

Mean ± SE (standard Error, n = 3)

Example 3: Nanostarch Size Measurement Via
Scanning Electron Microscopy (SEM)

The particle size of the nanostarch was measured using SEM, and the results indicated that the average particle size of the nanocomposite coating was 13.5 nanometers (nm). In comparison, the nanoparticle size range for standard synthetic coatings typically falls between 1 and 100 nm as shown in Table 2. The data indicates that the organic nanocomposite coating of the present disclosure has a finer particle size, which may offer distinct properties and advantages in pharmaceutical applications.

TABLE 2

Measurement of nanostarch particle size via SEM.

| Materials | Nanostarch particle size |
| --- | --- |
| Nanocomposite coating | 13.5 nm |
| Synthetic coating | 1 nm-100 nm (Standard) |

Example 4: Determination of Water Absorption by
American Society for Testing and Materials
(ASTM) D570

The nanocomposite coating prepared was further evaluated to measure its water absorption. The tests to determine water absorption were carried out in accordance with ASTM D570. The purpose of ASTM D570 is to determine the water absorption rate by immersing the specimen (nanocomposite coating for pharmaceutical applications) in water for a specific period. Water absorption was calculated by determining the percentage increase in weight of the sample following the experiment to characterize this property. The results of the study are depicted in Table 3. The results of the water absorption test showed that the nanocomposite coating exhibited a water absorption of 0.05 wt. %. In comparison, the water absorption for synthetic coatings typically ranges from 0 to 0.16%. These results indicate that the organic nanocomposite coating prepared in the present disclosure demonstrates superior water resistance, with a notably lower water absorption rate than standard synthetic coatings.

TABLE 3

Determination of water absorption by ASTM D570.

| Materials | Water absorption | ASTM D570 water absorption |
| --- | --- | --- |
| Nanocomposite coating | 0.05% | Water absorption by ASTM is 0%-0.16%. |
| Synthetic coating | 0%-0.16% | |

Example 5: Burning (Odor) Test According to the
ASTM D3801

The nanocomposite coating was further assessed for its burning characteristics, with the tests conducted in accordance with ASTM D3801 as shown in Table 4. This method is used to evaluate the odor, flame color, burning speed, and spark generation of materials when exposed to fire. The results showed that both the organic nanocomposite coating and synthetic coatings exhibited low odor during combustion, with a yellow-orange flame color for both materials. The nanocomposite coating demonstrated a very slow burning speed, while the synthetic coating had a slow-burning speed. Additionally, both materials produced sparks during the test. These results indicate that the organic nanocomposite coating shares similar burning characteristics with the synthetic coating, with slight differences in burning speed.

TABLE 4

Burning (odor) test according to the ASTM D3801.

| Materials | Odor | Color of flame | Speed of burning | Spark or not |
| --- | --- | --- | --- | --- |
| Nanocomposite coating | Low odor | Yellow-orange | Very Slow | Spark (Light) |
| Synthetic coating by ASTM D3801 | Low odor | Yellow-orange | Slow | Spark |

Example 6: Determination of Drying Time of
Nanocomposite Coating

The drying time of the nanocomposite coating was evaluated in accordance with ASTM A500. The results indicated that the drying time for both the organic nanocomposite coating and the synthetic coating was 1.5 h as tabularized in Table 5. According to ASTM A500, the typical drying time range for these materials is between 0 and 3 h, suggesting that the nanocomposite coating dries within the standard time frame comparable to synthetic coatings.

TABLE 5

Determination of drying time of nanocomposite coating.

| Materials | Drying time (h) | ASTM A500 |
| --- | --- | --- |
| Nanocomposite coating | 1.5 | 0-3 h |
| Synthetic coating | 1.5 | |

Example 7: Determination of Chemical Elements
Via EN (European Standard EN166) in
Nanocomposite Coating The chemical elements present in the nanocomposite coating were determined, in parts per million (ppm), in accordance with the European Standard EN166. The analysis identified the following elements: potassium (K), sodium (Na), phosphorus (P), chlorine (Cl), calcium (Ca), silicon (Si), iron (Fe), magnesium (Mg), zinc (Zn), manganese (Mn), and boron (B). These values were compared to the typical ranges for synthetic coatings, which include similar elements.

TABLE 6

Determination of chemical element test by
EN (European Standard EN166).

| Chemical elements | Nanocomposite coating (ppm) | Synthetic coating (ppm) |
| --- | --- | --- |
| K | 9.1 ± 0.3b | 10 |
| Na | 4.3 ± 0.2bc | 5 |
| P | 7.0 ± 0.2d | 10 |
| Cl | 0.59 ± 0.03a | 2 |
| $CO_3$ | 157 ± 1.0a | 440-5 |
| Ca | 3.3 | 10 |
| Si | 1.0 | 5 |
| Fe | 3.3 | 5 |
| Mg | 2.0 | 5 |

TABLE 6-continued

Determination of chemical element test by
EN (European Standard EN166).

| Chemical elements | Nanocomposite coating (ppm) | Synthetic coating (ppm) |
| --- | --- | --- |
| Zn | 1.8 | 5 |
| Mn | 1.2 | 5 |
| B | 0.5 | 5 |

Numerous modifications and variations of the present disclosure are possible in light of the above teachings. It is, therefore, to be understood that within the scope of the appended claims, the invention may be practiced otherwise than as specifically described herein.

The invention claimed is:

1. An organic nanocomposite coating for a pharmaceutical preparation, comprising:
   a plant-based nanostarch comprising avocado seed starch, pumpkin peel starch, moringa seed starch, corn starch and potato starch,
   an organic composition comprising Acacia *arabica* gel, Lannea sp. natural gum, olive leaf extract, fish-based glycerin and okra gel;
   an antioxidant mixture including at least one pigment; and
   a plasticizer,
   wherein the nanostarch has an average particle size of 16 nanometer (nm) or less.

2. The organic nanocomposite coating of claim 1, wherein the pigment is at least one selected from the group consisting of beetroot peel, *bougainvillea* flower, dragon peel, and fig fruit peel.

3. The organic nanocomposite coating of claim 1, wherein the organic nanocomposite coating has a carotene content of 2 to 3.5 liters per milligram (L/mg).

4. The organic nanocomposite coating of claim 1, wherein the organic nanocomposite coating has an anthocyanin content of 4 to 5.5 L/mg.

5. The organic nanocomposite coating of claim 1, having a pH of 6.5 to 7.5.

6. The organic nanocomposite coating of claim 1, wherein the nanostarch has an average particle size of 14 nm or less.

7. The organic nanocomposite coating of claim 1, wherein the plant-based nanostarch is present in an amount of 40 to 60 wt. % relative to a total weight of the organic nanocomposite coating.

8. The organic nanocomposite coating of claim 1, wherein the potato starch is present in the plant-based nanostarch in an amount of 1 to 10 wt. % relative to a total weight of the plant-based nanostarch.

9. The organic nanocomposite coating of claim 1, wherein the plasticizer is at least one selected from the group consisting of diisononyl phthalate (DINP), di-2-ethylhexyl phthalate (DEHP), diisodecyl phthalate (DIDP) and tri (2-ethylhexyl)trimellitate (TEHTM).

10. The organic nanocomposite coating of claim 1, wherein the avocado seed starch is present in the plant-based nanostarch in an amount of 15 to 25 wt. % relative to a total weight of the plant-based nanostarch.

11. The organic nanocomposite coating of claim 1, wherein the plasticizer is diisodecyl phthalate.

12. A method of making the organic nanocomposite coating of claim 1, comprising:
   hydrolyzing a mixture of avocado seed, pumpkin peel, and potato starch with at least one inorganic acid to obtain the plant-based nanostarch; and
   combining the plant-based nanostarch with the organic composition, the plasticizer, and the antioxidant mixture to form the organic nanocomposite coating.

13. The method of claim 12, further comprising:
   shaping the organic nanocomposite coating into a film or capsule; and
   drying the capsule for 1 to 3 hours (h) at a temperature of 25 to 40° C.

14. The method of claim 13, wherein the organic nanocomposite coating is in the form of a capsule having a wall thickness of 1 to 20 micrometer (μm).

15. The method of claim 12, wherein the inorganic acid is at least one selected from the group including hydrochloric acid, nitric acid, hydrobromic acid, sulfuric acid, hydrofluoric acid, and phosphorous acid.

16. The method of claim 12, wherein the inorganic acid is a mixture of sulfuric acid and hydrochloric acid.

17. The method of claim 12, further comprising:
   combining the avocado seed, the pumpkin peel, and the potato starch to obtain a mixture; and
   drying the mixture at a temperature of 115 to 155° C. for 1 to 4 h.

18. The method of claim 12, wherein the okra gel is present in an amount of 1 to 6 wt. % relative to a total weight of the organic composition.

19. The method of claim 12, wherein the pumpkin peel is present in an amount of 10 to 25 wt. % relative to a total weight of the plant-based nanostarch.

20. The method of claim 12, wherein the beetroot peel is present in an amount of 2 to 8 wt. % relative to a weight of the antioxidant mixture.

* * * * *